United States Patent
Wenz et al.

(10) Patent No.: US 7,358,290 B2
(45) Date of Patent: Apr. 15, 2008

(54) POLYCARBONATE MOLDING COMPOSITIONS WITH IMPROVED HYDROLYSIS RESISTANCE

(75) Inventors: Eckhard Wenz, Köln (DE); Thomas Eckel, Dormagen (DE); Olaf Meincke, Heinsberg (DE); Holger Warth, The Peak (HK); Herbert Eichenauer, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/342,739

(22) Filed: Jan. 30, 2006

(65) Prior Publication Data

US 2006/0189739 A1    Aug. 24, 2006

(30) Foreign Application Priority Data

Feb. 2, 2005    (DE)    ............... 10 2005 004 688

(51) Int. Cl.
*C08K 3/26* (2006.01)
*C08L 69/00* (2006.01)

(52) U.S. Cl. ............... 524/426; 524/115; 524/504; 524/508

(58) Field of Classification Search ............... 524/504, 524/508, 425, 426, 115; 525/67
See application file for complete search history.

(56) References Cited

U.S. PATENT DOCUMENTS 6,831,120 B1    12/2004  Zobel et al. ............... 524/124
2004/0166047 A1  8/2004  Vogels et al. ............... 423/432

FOREIGN PATENT DOCUMENTS

JP    2002-60610    2/2002

OTHER PUBLICATIONS

English language translation of JP 2002-060610, published Feb. 26, 2002.*

* cited by examiner

*Primary Examiner*—Fred Teskin
(74) *Attorney, Agent, or Firm*—Aron Preis

(57) ABSTRACT

A thermoplastic molding composition is disclosed. The composition that contains at least one member selected from the group consisting of aromatic polycarbonate and polyester carbonate, a rubber-modified vinyl (co)polymer, and calcium carbonate having average particle diameter of less than 100 nm is particularly suitable for making articles resistant to hydrolysis.

7 Claims, No Drawings

POLYCARBONATE MOLDING COMPOSITIONS WITH IMPROVED HYDROLYSIS RESISTANCE

FIELD OF THE INVENTION

The invention relates to thermoplastic molding compositions and in particular to rubber-modified polycarbonate compositions.

BACKGROUND OF THE INVENTION

Polymer blends of polycarbonate (PC) and acrylonitrile-butadiene-styrene (ABS) copolymer have long been known. Because of their particular combination of properties comprising heat-resistance, good (low temperature) toughness and improved processing behavior relative to pure polycarbonate, PC-ABS blends are particularly suitable, for example, for automotive interior and exterior applications.

Flame resistance may be imparted to these blends by halogen-based, but in particular by halogen-free flame retardants. Flame-resistant PC-ABS blends, in particular those based on halogen-free phosphate esters as flame retardant, have become well established in the fields of electrical engineering and information technology over the last 15 years.

To improve the long-term service life of the materials, in particular when used at elevated temperature and ambient humidity, it is desirable to improve the hydrolysis resistance of the materials. Hydrolysis resistance is understood to mean retardation of the degradation of the molecular weight of the polycarbonate.

The use of inorganic calcium carbonates such as described in JP-A 2002-060610 is suitable for this purpose. The compounds described therein are in the particle-size range of 2-5 µm.

On the other hand, a high degree of toughness is demanded of the functional parts produced from the molding compositions.

However, as a rule the addition of inorganic fillers results in an impairment in particular of notch impact resistance.

The object of the present invention was thus to provide PC-ABS compositions which are distinguished by improved hydrolysis resistance while maintaining a high degree of toughness.

It has surprisingly been found that the addition of very finely divided calcium carbonates with an average particle diameter of less than 100 nm greatly increases hydrolysis resistance without impairing the toughness of the blend.

SUMMARY OF THE INVENTION

A thermoplastic molding composition is disclosed. The composition that contains at least one member selected from the group consisting of aromatic polycarbonate and polyester carbonate, a rubber-modified vinyl (co)polymer, and calcium carbonate having average particle diameter of less than 100 nm is particularly suitable for making articles resistant to hydrolysis.

DETAILED DESCRIPTION OF THE INVENTION

The present invention therefore provides compositions containing
A) aromatic polycarbonate or polyester carbonate or mixtures thereof,
B) rubber-modified vinyl (co)polymers,
C) calcium carbonates with an average particle diameter of less than 100 nm
and optionally
D) phosphorus-based flame retardants,
E) antidripping agents,
F) conventional functional additives In particular, this invention relates to compositions containing
A) 20 to 98 parts by weight, preferably 30 to 95 parts by weight, in particular 40 to 90 parts by weight of aromatic polycarbonate and/or polyester carbonate,
B) 1 to 79.99 parts by weight, preferably 2 to 70 parts by weight, in particular 3 to 50, very particularly preferably 3 to 40 parts by weight of rubber-modified vinyl(co) polymer,
C) 0.01 to 5 parts by weight, preferably 0.02 to 2 parts by weight, in particular 0.05 to 1 parts by weight of calcium carbonate with an average particle diameter of less than 100 nm
and optionally
D) 1 to 30 parts by weight, preferably 2 to 25 parts by weight, in particular 2 to 20 parts by weight of a phosphorus compound as flame retardant,
E) 0 to 1 part by weight, preferably 0.1 to 0.5 parts by weight, in particular 0.2 to 0.5 parts by weight of an antidripping agent, preferably a fluorinated polyolefins and
F) up to 20 parts by weight, preferably up to 15 parts by weight, in particular up to 10 parts by weight of conventional functional additives, wherein the parts by weight of all the components are such that the total of all the parts by weight is 100.

Component A

Aromatic polycarbonates and/or aromatic polyester carbonates according to Component A suitable according to the invention are known are available in commerce and may be produced using known processes (for the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates proceeds for example by melting processes or by reacting aromatic dihydroxy compounds with carbonic acid halides, preferably phosgene, and/or with aromatic dicarboxylic acid dihalides, preferably benzenedicarboxylic acid dihalides, by the phase boundary process, optionally using chain terminators, for example monophenols, and optionally using trifunctional or more than trifunctional branching agents, for example triphenols or tetraphenols.

Aromatic dihydroxy compounds for producing aromatic polycarbonates and/or aromatic polyester carbonates are preferably those of the formula (I)

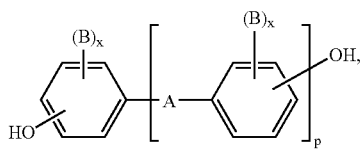

wherein.

A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic rings optionally containing heteroatoms may be fused, or a residue of the formula (II) or (III)

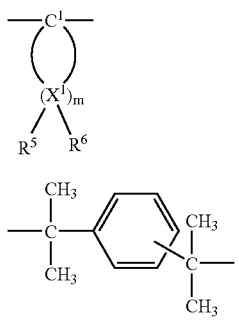

B is in each case $C_1$ to $C_{12}$ alkyl, preferably methyl, halogen, preferably chlorine and/or bromine
x is in each case mutually independently 0, 1 or 2,
p is 1 or 0, and
$R^5$ and $R^6$, individually selectable for each $X^1$, mutually independently mean hydrogen or $C_1$ to $C_6$ alkyl, preferably hydrogen, methyl or ethyl,
$X^1$ means carbon and
m means an integer from 4 to 7, preferably 4 or 5, with the proviso that on at least one atom $X^1$, $R^5$ and $R^6$ are simultaneously alkyl.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis(hydroxyphenyl)ethers, bis(hydroxyphenyl) sulfoxides, bis(hydroxyphenyl)ketones, bis-(hydroxyphenyl)sulfones and α,α-bis-(hydroxyphenyl)-diisopropylbenzenes as well as the ring-brominated and/or ring-chlorinated derivatives thereof.

Particularly preferred aromatic dihydroxy compounds are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3.3.5-trimethylcyclohexane, 4,4'-dihydroxydiphenyl sulfide, 4,4'-dihydroxydiphenyl sulfone and the di- and tetrabrominated or chlorinated derivatives thereof such as for example 2,2-bis(3-chloro-4-hydroxyphenyl)propane, 2,2-bis-(3,5-dichloro-4-hydroxyphenyl)propane or 2,2-bis-(3,5-dibromo-4-hydroxyphenyl) propane. 2,2-bis-(4-hydroxyphenyl)propane (bisphenol A) is particularly preferred.

The aromatic dihydroxy compounds may be used individually or as any desired mixtures. The aromatic dihydroxy compounds are known from the literature or may be obtained using processes known from the literature.

Chain terminators suitable for the production of thermoplastic, aromatic polycarbonates are for example phenol, p-chlorophenol, p-tert.-butylphenol or 2,4,6-tribromophenol, and also long-chain alkylphenols, such as 4-(1,3-tetramethylbutyl)phenol according to DE-A 2 842 005 or monoalkylphenol or dialkylphenols with a total of 8 to 20 C atoms in the alkyl substituents, such as 3,5-di-tert-butylphenol, p-isooctylphenol, p-tert.-octylphenol, p-dodecylphenol and 2-(3,5-dimethylheptyl)phenol and 4-(3,5-dimethylheptyl)phenol. The quantity of chain terminators to be used amounts in general to between 0.5 mol %, and 10 mol %, relative to the total number of moles of the diphenols used in each case.

The thermoplastic, aromatic polycarbonates may be branched in known manner, preferably by incorporating 0.05 to 2.0 mol %, relative to the total of the aromatic dihydroxy compounds used, of compounds having functionalities of three of more for example those with three or more phenolic groups.

Both homopolycarbonates and copolycarbonates are suitable. To produce copolycarbonates according to Component A according to the invention, it is also possible to use 1 to 25 wt. %, preferably 2.5 to 25 wt. % (relative to the total quantity of aromatic dihydroxy compounds to be used) of polydiorganosiloxanes with hydroxyaryloxy terminal groups. These are known (for example U.S. Pat. No. 3,419,634) or may be produced using processes known from the literature. The production of copolycarbonates containing polydiorganosiloxanes is described in DE-A 3 334 782 for example.

In addition to bisphenol A homopolycarbonates, preferred polycarbonates are the copolycarbonates of bisphenol A with up to 15 mol %, relative to the total number of moles of aromatic dihydroxy compounds, of aromatic dihydroxy compounds other than those stated to be preferred or particularly preferred.

Aromatic dicarboxylic acid dihalides for the production of aromatic polyester carbonates are preferably the diacid dichlorides of isophthalic acid, terephthalic acid, diphenylether-4,4'-dicarboxylic acid and naphthalene-2,6-dicarboxylic acid.

Particularly preferred are mixtures of the diacid dichlorides of isophthalic acid and terephthalic acid in the ratio of between 1:20 and 20:1.

When producing polyester carbonates, a carbonic acid halide, preferably phosgene, is additionally used as a bifunctional acid derivative.

In addition to the monophenols already mentioned, suitable chain terminators for the production of aromatic polyester carbonates are the chloroformic acid esters of said monophenols as well as the acid chlorides of aromatic monocarboxylic acids, which may optionally be substituted by $C_1$ to $C_{22}$ alkyl groups or by halogen atoms, and aliphatic $C_2$ to $C_{22}$ monocarboxylic acid chlorides.

The quantity of chain terminators amounts in each case to 0.1 to 10 mol %, relative, in the case of phenolic chain terminators, to the moles of aromatic dihydroxy compounds and, in the case of monocarboxylic acid chloride chain terminators, to the moles of dicarboxylic acid dichlorides.

Aromatic hydroxycarboxylic acids may also be incorporated into the aromatic polyester carbonates.

The aromatic polyester carbonates may be both linear and branched in known manner (see in this respect DE-A 2 940 024 and DE-A 3 007 934).

The branching agents used may be for example tri- or polyfunctional carboxylic acid chlorides, such as trimesic acid trichloride, cyanuric acid trichloride, 3,3'-,4,4'-benzophenone tetracarboxylic acid tetrachloride, 1,4,5,8-napthalene tetracarboxylic acid tetrachloride or pyromellitic acid tetrachloride, in quantities of 0.01 to 1.0 mol % (relative to the dicarboxylic acid dichlorides used) or tri- or polyfunctional phenols, such as phloroglucinol, 4,6-dimethyl-2,4,6-tri-(4-hydroxyphenyl)-hept-2-ene, 4,4-dimethyl-2,4-6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis[4,4-bis(4-hydroxyphenyl)-cyclohexyl]propane, 2,4-bis(4-hydroxyphenylisopropyl)phenol, tetra-(4-hydroxyphenyl)methane, 2,6-bis(2-hydroxy-5-methylbenzyl)-4-methylphenol, 2-(4-hydroxyphenyl)-2-(2,4-dihydroxyphenyl)propane, tetra-(4-[4-hydroxyphenylisopropyl]phenoxy)methane, 1,4-bis[4,4'-dihydroxytriphenyl)methyl]benzene, in quantities of 0.01 to 1.0 mol % relative to the aromatic dihydroxy compounds used. Phenolic branching agents may be initially introduced with the aromatic dihydroxy compounds, while acid chloride branching agents may be introduced together with the acid dichlorides.

The proportion of carbonate structural units in the thermoplastic, aromatic polyester carbonates may vary as desired. The proportion of carbonate groups preferably amounts to up to 100 mol %, in particular up to 80 mol %, particularly preferably up to 50 mol %, relative to the total number of ester groups and carbonate groups. Both the ester and the carbonate moieties of the aromatic polyester carbonates may be present in the polycondensate in the form of blocks or randomly distributed.

The relative solution viscosity ($\eta_{rel}$) of the aromatic polycarbonates and polyester carbonates is in the range from 1.18 to 1.4, preferably 1.20 to 1.32 (measured using solutions of 0.5 g polycarbonate or polyester carbonate in 100 ml methylene chloride solution at 25° C.).

The thermoplastic, aromatic polycarbonates and polyester carbonates may be used alone or in any desired mixture.

Component B

Component B comprises graft polymers B1 containing at least one vinyl monomer grafted onto at least one rubber with a glass transition temperature of less than 10° C. as grafting backbone.

Preferred graft polymers B1 are one or more graft polymers of 5 to 95 wt. %, preferably 10 to 90 wt. %, of monomers of a mixture of 1. 50 to 99 wt. %, in particular 50 to 90, still more preferably 55 to 85, very particularly preferably 60 to 80 wt. % of vinyl aromatics and/or ring-substituted vinyl aromatics (such as for example styrene, α-methylstyrene, p-methylstyrene, p-chlorostyrene) and/or methacrylic acid ($C_1$-$C_8$)alkyl esters (such as methyl methacrylate, ethyl methacrylate) and
2. 1 to 50 wt. %, in particular 10 to 50, still more preferably 15 to 45, very particularly preferably 20 to 40 wt. % of vinyl cyanides (unsaturated nitriles such as acrylonitrile and methacrylonitrile) and/or (meth)acrylic acid ($C_1$-$C_8$) alkyl esters (such as methyl methacrylate, n-butyl acrylate, t-butyl acrylate) and/or derivatives (such as anhydrides and imides) of unsaturated carboxylic acids (for example maleic anhydride and N-phenylmaleimide) grafted onto
    95 to 5, preferably 80 to 10 wt. % of one or more rubbers with glass transition temperatures of less than 10° C., preferably less than 0° C., particularly preferably less than –20° C. as grafting backbone.

The grafting backbone has in general an median particle size ($d_{50}$ value) of 0.05 to 10 μm, preferably 0.1 to 5 μm, particularly preferably 0.2 to 2 μm.

The median particle size $d_{50}$ is the diameter above and below which are located in each case 50 wt. % of the particles. It may be determined by means of ultra-centrifuge measurement (W. Scholtan, H. Lange, Kolloid, Z. und Z. Polymere 250 (1972), 782-1796).

Preferred monomers of group 1 are selected from among at least one of the monomers styrene, α-methylstyrene and methyl methacrylate, preferred monomers of group 2 are selected from among at least one of the monomers acrylonitrile, maleic anhydride and methyl methacrylate.

Monomers which are particularly preferred are styrene from group 1 and acrylonitrile from group 2.

Grafting backbones suitable for the graft polymers B1 are for example diene rubbers, EP(D)M rubbers, i.e. those based on ethylene/propylene and optionally diene, acrylate, polyurethane, silicone, chloroprene and ethylene/vinyl acetate rubbers and composite rubbers, consisting of two or more of the above-stated systems, for example silicone acrylate rubbers.

Diene rubbers for the purposes of the present invention are those based for example on butadiene, isoprene etc. or mixtures of diene rubbers or copolymers of diene rubbers or mixtures thereof with further copolymerizable monomers (for example according to the above groups 1 and 2), such as for example butadiene/styrene copolymers, with the proviso that the glass transition temperature of the grafting backbone is less than 10° C., preferably less than 0° C., particularly preferably less than –10° C.

Pure polybutadiene rubber is particularly preferred.

Paticularly preferred graft polymers B1 are for example ABS polymers (emulsion, bulk and suspension ABS), as described for example in DE-A 2 035 390 (=U.S. Pat. No. 3,644,574) or in DE-A 2 248 242 (=GB-PS 1 409 275) or in Ullmanns Enzyklopädie der technischen Chemie, Vol. 19 (1980), p. 280 ff. The gel fraction of the grafting backbone amounts to at least 30 wt. %, preferably at least 40 wt. %.

The gel content of the grafting backbone is determined at 25° C. in toluene (M. Hoffmann, H. Krömer, R. Kuhn, Polymeranalytik I and II, Georg Thieme-Verlag, Stuttgart 1977).

The graft copolymers B1 are produced by free-radical polymerization, for example by emulsion, suspension, solution or bulk polymerization, preferably by emulsion or bulk polymerization.

Further particularly suitable graft rubbers are ABS polymers produced by redox initiation with an initiator system comprising organic hydroperoxide and ascorbic acid according to U.S. Pat. No. 4,937,285.

Since it is known that, in the grafting reaction, the grafting monomers are not necessarily all grafted onto the grafting backbone, graft polymer is understood according to the invention also to mean those products which are obtained by (co)polymerization of the grafting monomers in the presence of the grafting backbone and also arise during working up.

Acrylate rubbers suitable as the grafting backbone are preferably polymers of acrylic acid alkyl esters, optionally also copolymers with up to 40 wt. %, relative to the grafting backbone, of other polymerizable, ethylenically unsaturated monomers. The preferred polymerizable acrylic acid esters include $C_1$-$C_8$ alkyl esters, for example methyl, ethyl, butyl, n-octyl and 2-ethylhexyl esters; haloalkyl esters, preferably halo-$C_1$-$C_8$-alkyl esters, such as chloroethyl acrylate and mixtures of these monomers.

For crosslinking, monomers with more than one polymerizable double bond may be copolymerized. Preferred examples of crosslinking monomers are esters of unsaturated monocarboxylic acids with 3 to 8 C atoms and unsaturated monovalent alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; and also triallyl phosphate and diallyl phthalate.

Preferred crosslinking monomers are allyl methacrylate, ethylene glycol dimethacrylate, diallyl phthalate and heterocyclic compounds comprising at least three ethylenically unsaturated groups.

Particularly preferred crosslinking monomers are the cyclic monomers triallyl cyanurate, triallyl isocyanurate, triacryloylhexahydro-s-triazine, triallyl benzenes. The quantity of crosslinked monomers amounts preferably to 0.02 to 5, in particular 0.05 to 2 wt. %, relative to the grafting backbone.

In the case of cyclic crosslinking monomers with at least three ethylenically unsaturated groups, it is advantageous to restrict the quantity to below 1 wt. % of the grafting backbone.

Preferred "other" polymerizable, ethylenically unsaturated monomers, which may, in addition to the acrylic acid esters, optionally serve to produce the grafting backbone, are for example acrylonitrile, styrene, α-methylstyrene, acrylamides, vinyl-$C_1$-$C_6$-alkylether, methyl methacrylate, butadiene. Acrylate rubbers preferred as the grafting backbone are emulsion polymers, which exhibit a gel content of at least 60 wt. %.

Further suitable grafting backbones are silicone rubbers with active grafting sites, such as are described in DE-A 3 704 657, DE-A 3 704 655, DE-A 3 631 540 and DE-A 3 631 539.

Component B may furthermore contain one or more thermoplastic vinyl (co)polymers B2, in which the abovementioned graft polymers B1 are present, preferably in dispersed form, in the composition according to the invention.

Suitable as the vinyl (co)polymers B2 are polymers of at least one monomer from the group comprising vinyl aromatics, vinyl cyanides (unsaturated nitriles), (meth)acrylic acid ($C_1$ to $C_8$) alkyl esters, unsaturated carboxylic acids and derivatives (such as anhydrides and imides) of unsaturated carboxylic acids. Particularly suitable are (co)polymers comprising 50 to 99, preferably 60 to 80 wt. % of vinyl aromatics and/or ring-substituted vinyl aromatics (such as for example styrene, a-methylstyrene, p-methylstyrene, p-chlorostyrene) and/or methacrylic acid ($C_1$ to $C_8$) alkyl esters (such as methyl methacrylate, ethyl methacrylate), and 1 to 50, preferably 20 to 40 wt. % of vinyl cyanides (unsaturated nitriles) such as acrylonitrile and methacrylonitrile and/or (meth)acrylic acid ($C_1$-$C_8$) alkyl esters (such as methyl methacrylate, n-butyl acrylate, t-butyl acrylate) and/or unsaturated carboxylic acids (such as maleic acid) and/or derivatives (such as anhydrides and imides) of unsaturated carboxylic acids (for example maleic anhydride and N-phenylmaleimide).

The (co)polymers B2 are resinous and thermoplastic.

The copolymer of styrene and acrylonitrile is particularly preferable.

The (co)polymers according to B2 are known and may be produced by free-radical polymerization, in particular by emulsion, suspension, solution or bulk polymerization. The (co)polymers preferably have average molecular weights $M_W$ (weight average, determined by light scattering or sedimentation) of between 15,000 and 200,000, in particular between 50,000 and 180,000.

Component C

Component C comprises calcium carbonates with an average particle size of less than 100 nm, preferably less than 90 nm, particularly preferably less than 50 nm. The average particle size in principle has no lower limit, but it amounts conventionally to more than 6 nm.

The average particle size relates to the primary particle size, determinable using various methods. The particle size of the calcium carbonates used is not determined after compounding in the polymer blend, but rather directly after production either as a dispersion or as a powder. The average particle size may be determined using various common methods, such as for example transmission or scanning electron microscopy, ultracentrifugation, light scattering methods, adsorption measurements or air permeability.

The purity of the calcium carbonates is conventionally at least 95%, preferably over 97%.

Component D

Phosphorus-containing flame retardants for the purposes of the invention are preferably selected from among the groups of mono- and oligomeric phosphorus and phosphonic acid esters, phosphonate amines and phosphazenes, wherein mixtures of several components selected from among one or more of these groups may also be used as flame retardants. Other halogen-free phosphorus compounds not given particular mention here may be used alone or in any desired combination with other halogen-free phosphorus compounds.

Preferred mono- and oligomeric phosphorus or phosphonic acid esters are phosphorus compounds of the general formula (IV)

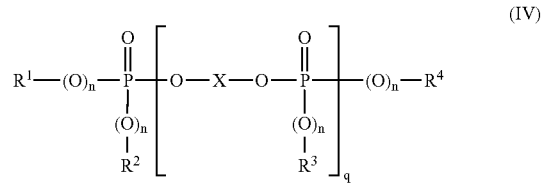

in which $R^1$, $R^2$, $R^3$ and $R^4$ mutually independently mean in each case optionally halogenated $C_1$ to $C_8$ alkyl, or $C_5$ to $C_6$ cycloalkyl, $C_6$ to $C_{20}$ aryl or $C_7$ to $C_{12}$ aralkyl in each case optionally substituted by alkyl, preferably $C_1$-$C_4$ alkyl, and/or halogen, preferably chlorine or bromine, n mutually independently means 0 or 1 q means 0 to 30 and

X means a mono- or polynuclear aromatic residue with 6 to 30 C atoms, or a linear or branched aliphatic residue with 2 to 30 C atoms, which may be OH-substituted and contain up to 8 ether bonds.

Preferably, $R^1$, $R^2$, $R^3$ and $R^4$ mutually independently denote $C_1$-$C_4$ alkyl, phenyl, naphthyl or phenyl-$C_1$-$C_4$-alkyl. The aromatic groups $R^1$, $R^2$, $R^3$ and $R^4$ may for their part be substituted with halogen and/or alkyl groups, preferably chlorine, bromine and/or $C_1$-$C_4$ alkyl. Particularly preferred aryl residues are cresyl, phenyl, xylenyl, propylphenyl or butylphenyl and the corresponding brominated and chlorinated derivatives thereof.

X in the formula (IV) preferably means a mono- or polynuclear aromatic residue with 6 to 30 C atoms. This is preferably derived from diphenols of the formula (1).

n in the formula (IV) may mutually independently be 0 or 1, preferably n is equal to 1.

q denotes values from 0 to 30. When using mixtures of various components of the formula (IV), it is preferable to use mixtures with number-averaged q-values of 0.3 to 20, particularly preferably 0.5 to 10, in particular 0.5 to 6.

X particularly preferably denotes

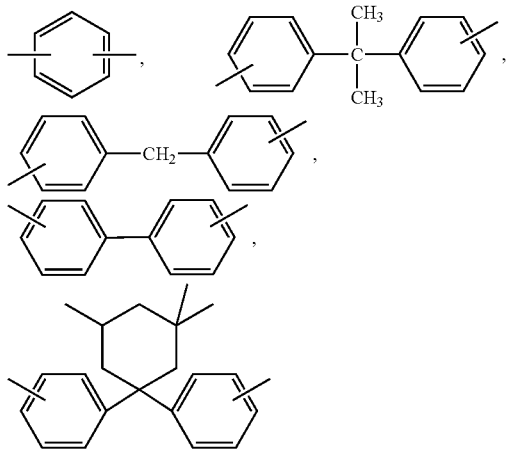

or the chlorinated or brominated derivatives thereof, in particular X is derived from resorcinol, hydroquinone, bisphenol A or diphenylphenol. Particularly preferably, X is derived from bisphenol A.

The use of oligomeric phosphate esters of the formula (IV), which are derived from the bisphenol A, is particularly advantageous, since the compositions provided with this phosphorus compound exhibit particularly high stress cracking and hydrolysis resistance and a particularly low tendency to deposit formation during processing by injection molding. Moreover, particularly good heat resistance may be achieved with these flame retardants.

Monophosphates (q=0), oligophosphates (q=1-30) or mixtures of mono- and oligophosphates may be used as Component C according to the invention.

Monophosphorus compounds of the formula (IV) are in particular tributylphosphate, tris-(2-chloroethyl)phosphate, tris-(2,3-dibromopropyl)phosphate, triphenyl phosphate, tricresyl phosphate, diphenylcresyl phosphate, diphenyloctyl phosphate, diphenyl-2-ethylcresyl phosphate, tri-(isopropylphenyl)phosphate, halosubstituted aryl phosphates, methylphosphonic acid dimethyl esters, methylphosphinous acid diphenyl esters, phenylphosphonic acid diethyl esters, triphenylphosphine oxide or tricresylphosphine oxide.

The phosphorus compounds according to Component C, formula (IV), are known (cf. for example EP-A 363 608, EP-A 640 655) or may be produced analogously in accordance with known methods (for example Ullmanns Enzyklopädie der technischen Chemie, Vol. 18, p. 301 ff. 1979; Houben-Weyl, Methoden der organischen Chemie, Vol. 12/1, p. 43; Beilstein Vol. 6, p. 177).

The average q-values may be determined in that the composition of the phosphate mixture (molecular weight distribution) is determined by means of suitable methods (gas chromatography (GC), high pressure liquid chromatography (HPLC), gel permeation chromatography (GPC) and the average values for q are calculated therefrom.

Phosphonate amines are preferably compounds of the formula (V)

in which

A denotes a residue of the formula (Va)

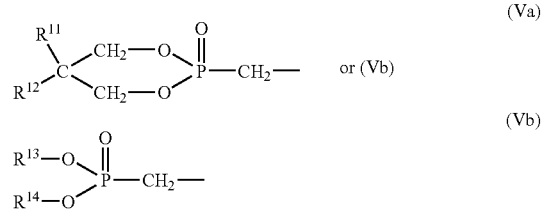

$R^{11}$ and $R^{12}$ mutually independently denote unsubstituted or substituted $C_1$-$C_{10}$ alkyl or unsubstituted or substituted $C_6$-$C_{10}$ aryl, $R^{13}$ and $R^{14}$ mutually independently denote unsubstituted or substituted $C_1$-$C_{10}$ alkyl or unsubstituted or substituted $C_6$-$C_{10}$ aryl or $R^{13}$ and $R^{14}$ together denote unsubstituted or substituted $C_3$-$C_{10}$ alkylene, y means the number values 0, 1 or 2 and B1 independently denotes hydrogen, optionally halogenated $C_2$-$C_8$ alkyl, unsubstituted or substituted $C_6$-$C_{10}$ aryl.

B1 preferably independently denotes hydrogen, ethyl, n- or iso-propyl, which may be halosubstituted, $C_6$-$C_{10}$ aryl, in particular phenyl or naphthyl, which is unsubstituted or substituted by $C_1$-$C_4$ alkyl and/or halosubstituted.

Alkyl in $R^{11}$, $R^{12}$, $R^{13}$ and $R^{14}$ independently preferably denotes methyl, ethyl, n-propyl, iso-propyl, n-, iso-, sec. or tert. butyl, pentyl or hexyl.

Substituted alkyl in $R^{11}$, $R^{12}$, $R^{13}$ and $R^{14}$ independently preferably denotes halosubstituted $C_1$-$C_{10}$ alkyl, in particular mono- or disubstituted methyl, ethyl, n-propyl, iso-propyl, n-, iso-, sec. or tert.-butyl, pentyl or hexyl.

$C_6$-$C_{10}$ aryl independently preferably denotes in $R^{11}$, $R^{12}$, $R^{13}$ and $R^{14}$ phenyl, naphthyl or binaphthyl, in particular o-phenyl, o-naphthyl, o-binaphthyl, which may be (in general mono-, di- or tri-) halosubstituted.

$R^{13}$ and $R^{14}$ may form a ring structure together with the oxygen atoms, to which they are directly attached, and the phosphorus atom.

The following are stated by way of example and as being preferred: 5,5,5',5',5'',5''-hexamethyl tris(1,3,2-dioxaphosphorinane-methane)amino-2,2',2''-trioxide of the formula (Va-1)

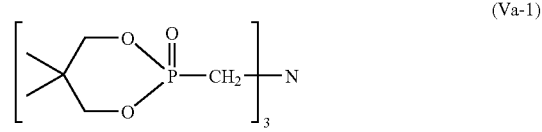

(Trial product XPM 1000, Solutia Inc., St. Louis, USA)

1,3,2-dioxaphosphorinane 2-methaneamine, N-butyl-N[(5,5-dimethyl-1,3,2-dioxaphosphorinan-2-yl)-methyl]-5,5-dimethyl-, P,2-dioxide; 1,3,2-dioxa-phosphorinane 2-methaneamine, N-[[5,5-dimethyl-1,3,2-dioxaphosphorinan-2-yl)

methyl]-5,5-dimethyl-N-phenyl-, P,2-dioxide; 1,3,2-dioxaphosphorinane 2-methaneamine, N,N-dibutyl-5,5-dimethyl-, 2-oxide, 1,3,2-dioxaphosphorinane 2-methaneimine, N-[(5,5-dimethyl-1,3,2-dioxaphosphorinan-2-yl)methyl]-N-ethyl-5,5-dimethyl-, P,2-dioxide, 1,3,2-dioxaphosphorinane 2-methaneamine, N-butyl-N-[(5,5-dichloromethyl-1,3,2-dioxaphosphorinan-2-yl)-methyl]-5, 5-dichloro-methyl-, P,2-dioxide, 1,3,2-dioxaphosphorinane 2-methaneamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane 2-methaneamine, N,N-di-(4-chlorobutyl)-5,5-dimethyl-2-oxide; 1,3,2-dioxaphosphorinane 2-methaneimine, N-[(5,5-dimethyl-1,3,2-dioxaphosphorinan-2-yl)methane]-N-(2-chloroethyl)-5,5-di(chloromethyl)-, P2-dioxide.

Also preferred are:
compounds of the formulae (Va-2) or (Va-3)

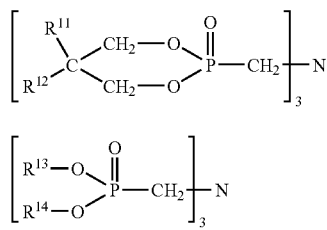

wherein $R^{11}$, $R^{12}$, $R^{13}$ and $R^{14}$ have the above-stated meanings.

Compounds of the formulae (Va-2) and (Va-1) are particularly preferred. Production of the phosphonate amines is described for example in U.S. Pat. No. 5,844,028.

Phosphazenes are compounds of the formulae (VIa) and (VIb)

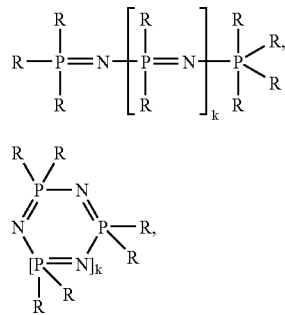

in which

R is in each case identical or different and denotes amino, in each case optionally halogenated, preferably fluorinated $C_1$ to $C_8$ alkyl or $C_1$ to $C_8$ alkoxy, or $C_5$ to $C_6$ cycloalkyl, $C_6$ to $C_{20}$ aryl, preferably phenyl or naphthyl, $C_6$ to $C_{20}$ aryloxy, preferably phenoxy, naphthyloxy, or $C_7$ to $C_{12}$ aralkyl, preferably phenyl-$C_1$-$C_4$-alkyl, in each case optionally substituted by alkyl, preferably $C_1$-$C_4$ alkyl, and/or halogen, preferably chlorine and/or bromine, k denotes 0 or a number from 1 to 15, preferably a number from 1 to 10.

Examples which may be mentioned are:
Propoxyphosphazene, phenoxyphosphazene, methylphenoxyphosphazene, aminophosphazene and fluoroalkylphosphazene.

Phenoxyphosphazene is preferred.

The phosphazenes may be used alone or as a mixture. The residue R may always be identical or 2 or more residues in the formulae (VIa) and (VIb) may be different.

Phosphazenes and the production thereof are described for example in EP-A 728 811, DE-A 1 961668 and WO 97/40092.

The flame retardants may be used alone or in any desired mixture or in a mixture with other flame retardants.

Component E

The flame retardants corresponding to Component D are often used in combination with so-called antidripping agents, which reduce the tendency of the material to drip burning droplets in case of fire. Examples which may be mentioned here are compounds of the substance classes comprising fluorinated polyolefins, silicones and aramid fibres. These may also be used in the compositions according to the invention. Fluorinated polyolefins are preferably used as antidripping agents.

Fluorinated polyolefins are known and described for example in EP-A 0 640 655. They are sold for example by DuPont as Teflon® 30N.

The fluorinated polyolefins may be used both in pure form and in the form of a coagulated mixture of emulsions of the fluorinated polyolefins with emulsions of graft polymers (Component B1) or with an emulsion of a copolymer, preferably based on styrene/acrylonitrile or PMMA, wherein the fluorinated polyolefin is mixed as an emulsion with an emulsion of the graft polymer or of the copolymer and then coagulated.

Furthermore, the fluorinated polyolefins may be used as a precompound with the graft polymer (Component B1) or a copolymer, preferably based on styrene/acrylonitrile or PMMA. The fluorinated polyolefins are mixed as a powder with a powder or granules of the graft polymer or copolymer and melt-compounded in general at temperatures of 200 to 330° C. in conventional units such as internal mixers, extruders or twin screw extruders.

The fluorinated polyolefins may also be used in the form of a masterbatch, which is produced by emulsion polymerization of at least one monoethylenically unsaturated monomer in the presence of an aqueous dispersion of the fluorinated polyolefin. Preferred monomer components are styrene, acrylonitrile, methyl methacrylate and mixtures thereof. The polymer is used as a flowable powder after acidic precipitation and subsequent drying.

The coagulates, precompounds or masterbatches conventionally have solids contents of fluorinated polyolefin of from 5 to 95 wt. %, preferably 7 to 80 wt. %. The fluorinated polyolefins are used in concentrations of 0 to 1 part by weight, preferably of 0.1 to 0.5 parts by weight, in particular 0.2 to 0.5 parts by weight, wherein these quantities relate to the pure fluorinated polyolefin in the case of use of a coagulate, precompound or masterbatch.

Component F (Conventional Functional Additives)

The compositions according to the invention may furthermore contain at least one conventional functional additive selected from the group consisting of mold release agent, for example pentaerythritol tetrastearate, a nucleating agent, antistatic agent, a thermal stabilizer, UV stabiliser, filler and reinforcing agent 1, for example a silicate such as talcum or wollastonite, a further flame retardant or a flameproofing synergist such as for example a nanoscale inorganic material, different from the claimed calcium carbonate) dye and pigment.

In addition, the compositions according to the invention contain further polymer components such as for example polyphenylene oxides, polyesters, epoxy resins or novolaks.

Where quantities are stated in this application in parts by weight, the total of the parts by weight of all the components in the composition amounts to 100.

The compositions according to the invention are produced by mixing the respective constituents in known manner and melt-compounding and melt-extruding them at temperatures of 200° C. to 300° C. in conventional units such as internal mixers, extruders and twin screw extruders.

Mixing of the individual constituents may proceed in known manner either successively or simultaneously, and indeed either at for instance 20° C. (room temperature) or at a higher temperature.

The compositions according to the invention may be used to produce moldings of all kinds. These may be produced for example by injection molding, extrusion and blow molding processes. Another type of processing is the production of moldings by thermoforming from previously produced sheets or films.

The invention therefore additionally provides a process for production of the compositions, use thereof for the production of moldings and the moldings themselves.

Examples of such moldings are films, profiles, casing components of all kinds, for example for domestic appliances such as juice extractors, coffee machines, mixers; for office machines such as monitors, printers, copiers; also sheets, tubes, electrical ducting, profiles for the construction sector, interior fittings and exterior applications; components from the field of electrical engineering, such as switches and connectors, and automotive interior and exterior components.

In particular, the compositions according to the invention may be used for example for the production of the following moldings:

interior fittings for rail vehicles, ships, aircraft, buses and cars, hubcaps, casings for electrical appliances containing miniature transformers, casings for equipment for broadcasting and transmitting information, casings and coverings for medical purposes, massagers and casings therefor, toy vehicles for children, large-area wall elements, casings for safety apparatus, tailgate spoilers, car body parts, thermally insulated transport containers, devices for keeping or caring for small animals, moldings for sanitary and bathroom fittings, cover gratings for fan openings, moldings for summer houses and sheds, casings for garden tools, safety components for inside cars.

The following Examples serve to illustrate the invention further.

EXAMPLES

The components indicated in Table 1 and explained briefly below were melt-compounded using a ZSK-25 at 260° C. The test specimens were produced on an injection molding machine of the type Arburg 270 E at 260° C.

Component A

Linear polycarbonate based on bisphenol A with a relative solution viscosity of 1.294 measured in $CH_2Cl_2$ as solvent at 25° C. and in a concentration of 0.5 g/100 ml.

Component B

The ABS component was a graft copolymer produced by the bulk polymerization process and consisting of polybutadiene (13%), polystyrene (67%) and polyacrylonitrile (20%), a product of Nippon A&L as Santac 08.

Component C

C1: Calcium carbonate (comparison according to JP A 2002-060610) with an average particle diameter of 5 µm (Shipron A, Shipro Kasei)

C2: Calcium carbonate with an average particle diameter of 80 um and an organic coating fraction of 2 wt. % (Socal U1S1, Solvay)

C3: Calcium carbonate with an average particle diameter of 80 nm. (Socal U1, Solvay)

C4: Calcium carbonate with an average particle diameter of 20 nm. (Socal U3, Solvay)

Component D

Bisphenol A-Based Oligophosphate

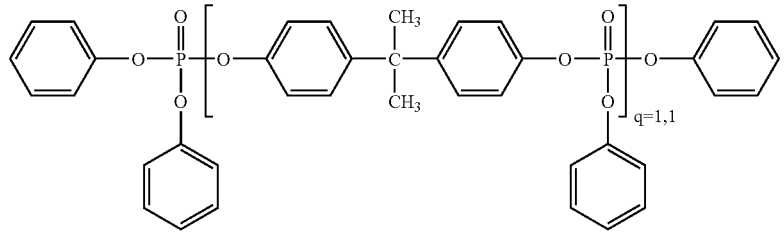

Component E

Tetrafluoroethylene polymer as a coagulated mixture of a graft polymer emulsion according to the above-stated Component B1 in water and a tetrafluoroethylene polymer emulsion in water. The ratio by weight of graft polymer B1 to the tetrafluoroethylene polymer in the mixture is 90 wt. % to 10 wt. %. The tetrafluoroethylene polymer emulsion has a solids content of 60 wt. %; the average particle diameter is between 0.05 and 0.5 µm. The graft polymer emulsion has a solids content of 34 wt. %.

The emulsion of the tetrafluoroethylene polymer (Teflon® 30 N, DuPont) is mixed with the emulsion of graft polymer B1 and stabilised with 1.8 wt. %, relative to polymer solids, of phenolic antioxidants. At 85 to 95° C., the mixture is coagulated with an aqueous solution Of $MgSO_4$ (Epsom salts) and acetic acid at pH 4 to 5, filtered and washed until virtually free of electrolytes, then the majority of the water is removed by centrifugation and the mixture is then dried to a powder at 100° C.

Component F1

Pentaerythritol tetrastearate (PETS) as mold release agent

Component F2
Phosphite stabiliser
Examination of the Properties of the Molding Compositions According to the Invention Notch impact resistance is determined at room temperature according to ISO 180/1A using test specimens measuring 80 mm×10 mm×4 mm.

The melt flow (MVR=Melt Viscosity Range) was determined to ISO 1133 at a melt temperature of 240° C. and with application of a weight of 5 kg.

The hydrolytic degradation was determined by 14-day storage of the granules at 95° C. and 100% atmospheric humidity. The increase in melt flow in % is calculated as a measure of the hydrolytic degradation of the polycarbonate.

The properties of the composition according to the invention or the test specimen obtained therefrom are listed in Table 1.

It is clear from Table 1 that the nanoscale calcium carbonates according to the invention exhibit substantially greater efficiency as hydrolysis stabilizers. V1 shows that, in the case of an input quantity of 1% of the coarsely divided calcium carbonate, a degree of hydrolysis stabilization may be found but notch impact resistance is markedly lower than the Comparative Example without hydrolysis stabiliser V0. In the case of an input quantity of 0.05%, only very inadequate hydrolysis stabilisation is observed, wherein only a slight reduction in notch impact resistance may be observed due to the low input quantity. In the case of the nanoscale calcium carbonates (E1-6) according to the invention, no impairment of toughness is observed within the error range for an input quantity of 0.05%-1%. The efficiency of the nanoscale calcium carbonates as hydrolysis stabilizers is in all cases greater than the comparison material with a particle size of 5 μm. In particular, Component C3 with the smallest particle size of 20 nm displays the best hydrolysis behavior while maintaining notch impact resistance.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
    A) at least one member selected from the group consisting of aromatic polycarbonate and polyester carbonate,
    B) rubber-modified vinyl (co)polymer,
    C) calcium carbonate having average particle diameter of less than 100 nm.

2. The composition according to claim 1 further comprising at least one member selected from the group consisting of
    D) phosphorus-based flame retardant,
    E) antidripping agent, and
    F) conventional functional additives.

3. The composition according to claim 1 containing
    20 to 98 parts by weight of A,
    1 to 80 parts by weight of B and
    0.01 to 5 parts by weight of calcium carbonate having an average particle diameter of less than 100 nm,
    wherein the total of all parts by weight amounts to 100.

4. The composition according to claim 1 comprising 20 to 98 parts by weight of A, 1 to 80 parts by weight of B,
    0.01 to 5 parts by weight of calcium carbonate having an average particle diameter of less than 100 nm, 1 to 30 parts by weight of a phosphorus compound as flame retardant,
    wherein the total of all parts by weight amounts to 100.

5. The composition according to claim 1 comprising
    20 to 98 parts by weight of A, 1 to 80 parts by weight of B, 0.01 to 5 parts by weight of calcium carbonate having an average particle diameter of less than 100 nm,

TABLE 1

| | V0 | V1 | V2 | E1 | E2 | E3 | E4 | E5 | E6 |
|---|---|---|---|---|---|---|---|---|---|
| Components [parts by weight] | | | | | | | | | |
| A (PC) | 69.80 | 68.80 | 69.75 | 68.80 | 68.80 | 68.80 | 69.75 | 69.75 | 69.75 |
| B (Bulk ABS) | 15.80 | 15.80 | 15.80 | 15.80 | 15.80 | 15.80 | 15.80 | 15.80 | 15.80 |
| C1 (Calcium carbonate) | | 1.00 | 0.05 | | | | | | |
| C2 (Calcium carbonate) | | | | 1.00 | | | 0.05 | | |
| C3 (Calcium carbonate) | | | | | 1.00 | | | 0.05 | |
| C4 (Calcium carbonate) | | | | | | 1.00 | | | 0.05 |
| D (BDP) | 12.90 | 12.90 | 12.90 | 12.90 | 12.90 | 12.90 | 12.90 | 12.90 | 12.90 |
| E (PTFE masterbatch) | 0.80 | 0.80 | 0.80 | 0.80 | 0.80 | 0.80 | 0.80 | 0.80 | 0.80 |
| F1 (PETS) | 0.40 | 0.40 | 0.40 | 0.40 | 0.40 | 0.40 | 0.40 | 0.40 | 0.40 |
| F2 (Stabiliser) | 0.30 | 0.30 | 0.30 | 0.30 | 0.30 | 0.30 | 0.30 | 0.30 | 0.30 |
| Properties | | | | | | | | | |
| $a_k$ (kJ/m$^2$) | 10.6 | 7.7 | 10.1 | 10.0 | 11.1 | 10.5 | 9.8 | 11.3 | 11.2 |
| MVR change after 72 h (%) | 136.2 | 41.7 | 116.3 | 21.2 | 18.5 | 10.7 | 55.3 | 50.8 | 38.6 |
| MVR change after 144 h (%) | 775.1 | 120.4 | 613.9 | 37.5 | 31.3 | 18.8 | 163.4 | 164.4 | 81.8 |
| MVR change after 192 h (%) | n.d.* | 267.8 | n.d.* | 48.1 | 45.8 | 31.0 | 546.6 | 469.3 | 165.8 |
| MVR change after 264 h (%) | n.d.* | 435.4 | n.d.* | 65.4 | 61.4 | 39.8 | n.d.* | n.d.* | 211.9 |
| MVR change after 336 h (%) | n.d.* | n.d.* | n.d.* | 86.9 | 81.6 | 55.3 | n.d.* | n.d.* | 276.6 |

*n.d. - value not determinable, material of too low a viscosity 1 to 30 parts by weight of phosphorus compound as flame retardant
and up to 1 part by weight of an antidripping agent, wherein the total of all parts by weight amounts to 100.

6. The composition according to claim 1 comprising 20 to 98 parts by weight of A, 1 to 80 parts by weight of B, 0.01 to 5 parts by weight of calcium carbonate having an average particle diameter of less than 100 nm, 1 to 30 parts by weight of a phosphorus compound as flame retardant, up to 1 part by weight of an antidripping agent, and up to 20 parts by weight of conventional functional additive or further polymer components wherein the total of all parts by weight amounts to 100.

7. A molded article comprising the composition of claim 1.

* * * * *